Patented May 25, 1948

2,442,141

UNITED STATES PATENT OFFICE 2,442,141

METHOD FOR PRODUCTION OF PENICILLIN

Andrew J. Moyer, Peoria, Ill., assignor to United States of America as represented by the Secretary of Agriculture No Drawing. Application May 11, 1945, Serial No. 593,183

9 Claims. (Cl. 195—36)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This is a continuation in part of my copending application for patent Serial No. 530,235, filed April 8, 1944, now abandoned.

This invention relates to a new and useful method for the production of penicillin.

Penicillin is a bactericidal or bacteriostatic compound that may be produced by *Penicillium notatum* Westling, as reported by Fleming (Brit. Jour. Exper. Path. 10, 226 (1929)), who first observed the inhibition of bacterial growth in the vicinity of *P. notatum* colonies on Petri-dish cultures. Penicillin possesses extremely valuable antibacterial properties which favor its application in the treatment of numerous infections. It is especially effective in repressing or killing gram-positive staphylococci, pneumococci, gonococci, and numerous streptococci. The physical and chemical properties of penicillin has been described by Abraham and Chain (Brit. Jour. Exper. Path. 23, 103, June 1942).

A major problem in making practical use of the valuable properties of penicillin has been the production of this substance by incubating fungus cultures in quantities large enough to provide sufficient penicillin for therapeutic use. Thus, although as much as one or two million "Oxford units" (Abraham et al., Lancet 2, 177, August 16, 1941) of penicillin might be required to treat each human infection, only two to eight "Oxford units" of penicillin could be produced per milliliter of fermentation medium by methods heretofore used, and numerous attempts to increase the efficiency of penicillin formation have been unsuccessful. The "Oxford unit" is at the present time the only means of evaluating penicillin, since its chemical structure is not known.

I have found a method of increasing the penicillin content of culture liquors of a penicillin-producing mold, such as *Penicillium notatum* Westling, *Penicillium chrysogenum* Thom, *Penicillium baculatum* Westling and *Penicillium cyaneo-fulvum* Biourge, many-fold beyond that taught by the prior art, and to such an extent that production of penicillin for use as a therapeutic agent is now more feasible on a commercial basis. In addition to giving a better yield of penicillin, the present invention offers numerous other advantages, which will be apparent from the following description.

Whereas previously used methods resulted in a slow production of penicillin during the first few days of the fermentation period, and a very rapid destruction of penicillin during the 24- to 48-hour period immediately following the time when the fermentation medium attained its maximum penicillin content, this invention results in the more rapid production of much greater quantities of penicillin in the culture liquors and the maintenance of a high level of penicillin content for several days after the maximum penicillin content is reached. The advantage of having a high penicillin content persisting for several days in a culture medium will be apparent when it is realized that the microbiological assay method used for the measurement of the penicillin content of liquors is slow (usually a 15- to 18-hour procedure), and that in previously used culture methods, much of the penicillin often disappeared from the fermentation liquors before the assay result indicating the peak production was obtained. When cultures are made according to the present invention, little or no penicillin disappears from the fermentation liquor by the time the assay results indicating peak production are obtained; accordingly, large batches of fermentation liquor of proven potency can be processed with the assurance that their penicillin content is high.

Previous investigators (Abraham et al., Lancet 2, 177 (1941)) have employed for penicillin production Czapek-Dox medium of the following composition:

| | Grams |
|---|---|
| Glucose | 40.0 |
| NaNO$_3$ | 3.0 |
| KH2PO4 | 1.0 |
| KCl | 0.5 |
| MgSO$_4$.7H$_2$O | 0.5 |
| FeSO$_4$.7H$_2$O | 0.01 |
| Water to make one liter | |

When *P. notatum* is cultivated on this medium, growth is slow, and the acidity of the medium increases for three to five days after which there is a slow rise in pH accompanied by a weak production of penicillin, usually amounting to two to eight "Oxford units" per ml. in eight to nine days.

I have found that increased quantities of penicillin are formed, and that the penicillin content of the fermentation medium is maintained at a high level for an increased period of time, if a medium of the following type is used:

| | |
|---|---|
| Assimilable carbon source such as saccharides, organic acids, or polyhydric alcohols (added periodically or continuously throughout the fermentation period) _____grams__ | 5.0 to 150 |
| Proteinaceous material such as protein or hydrolyzed protein_grams__ | 5.0 to 150 |
| $MGSO_4.7H_2O$ _____do____ | 0.1 to 0.5 |
| $KH_2PO_4$ _____do____ | 0.3 to 3.0 |
| $NaNO_3$, $KNO_3$, $CsNO_3$, $Mg(NO_3)_2$, $Ca(NO_3)_2$, or $Sr(NO_3)_2$_____do____ | 1 to 5 |
| $ZnSO_4.6H_2O$ _____milligrams__ | 8 to 80 |
| Ferric tartrate _____do____ | 10 to 100 |
| Water to make one liter | |

Using such a medium, and the procedures of this invention, penicillin production amounts to as much as 200 Oxford units per milliliter. Assimilable carbon source is here understood to include ions of an assimilable organic acid, polyhydric alcohol and saccharides (carbohydrates). Proteinaceous material is here understood to include unmodified protein and protein degradation products, particularly such products as arise from the hydrolysis of the protein. These protein degradation products include proteoses, peptones, polypeptides, peptides and amino acids.

The success of this invention is due, in part, to the fact that there is incorporated in the nutrient medium a considerable quantity of proteinaceous material either in the form of unhydrolyzed protein or in the form of protein materials which have undergone various degrees of hydrolysis. Although the incorporation of these materials in the nutrient medium favors the rapid production of large quantities of penicillin, and maintains the penicillin concentration at a high level during the final stages of the fermentation period, the precise mode of action of these nitrogenous materials is not known with certainty. It is probable that by virtue of the buffering capacity of their constituent amino acids or of the alkaline or acidic properties of their decarboxylated or deaminated constituent amino acids, these proteinaceous materials act as a means of regulating the pH of the culture medium at favorable levels during the course of the fermentation period, or that they supply some organic compound which is essential to the chemical structure of the penicillin molecule. It is also considered possible that the added proteinaceous materials may serve as agents upon which may be expended the action of enzymes which otherwise would inactivate the penicillin. The existence of such inactivating enzymes is known.

A wide variety of proteinaceous materials is effective in favoring penicillin production and stabilization; thus, corn-steeping liquor, wheat-steeping liquor, acid-hydrolyzed casein, enzyme-hydrolyzed casein, whey or whey concentrates, soybean meal, distillers grain slops, acid-hydrolyzed corn gluten, acid-hydrolyzed wheat gluten, and synthetic mixtures of numerous amino acids have been successfully employed. These proteinaceous materials need not be supplied in a high degree of purity; the less pure materials which carry traces of growth factors and considerable quantities of mineral nutrients are suitable for use. The use of corn-steeping liquor is especially advantageous, since it is a cheap, readily available byproduct of the corn wet-milling industries of this country. Corn-steeping liquor, supplied to the trade as the concentrated (30° Bé.) product, has the approximate analysis: Moisture 40–45 percent, proteins and protein-hydrolysis products 25–27 percent; carbohydrate 21–23 percent, and ash 9–10 percent. Since the ash of corn-steeping liquor consists principally of potassium, magnesium, phosphate, and sulfate, the use of this liquor as a constituent of the nutrient medium makes unnecessary the addition of potassium phosphate and magnesium sulfate, and thus simplifies and cheapens the process.

The presence of the nitrate ion in the nutrient medium is essential for good penicillin production. Sodium nitrate, as previously used, is a suitable source of nitrate ion. I have found that, in addition, other nitrates of the alkaline and alkaline earth metals, such as potassium, caesium, calcium, magnesium, and strontium, may be used for this purpose.

The success of this invention is also due, in part, to the fact that I do not add all the assimilable carbon source at the beginning of the fermentation period, as has been the practice in the previous art and also the practice disclosed in my copending application, Serial No. 593,184, filed May 11, 1945, but instead, I add a portion of the assimilable carbon source at the beginning of the incubation period, and add additional increments of assimilable carbon source periodically during the period. I have observed that when the fermenation medium is the Czapek-Dox medium, as used in the prior art, the glucose of the medium is metazolized by the fungus very rapidly, resulting in an assimilable carbon source exhaustion of the medium and the creation of an unfavorable environment for penicillin production. By adding glucose or other assimilable carbon source to the medium at intervals during the incubation period, as taught by this invention, the development of unfavorable conditions in the nutrient medium is avoided, and much greater penicillin production is realized.

Considerable latitude is possible as to the quantity of assimilable carbon source supplied in the medium at the beginning of the incubation period and added thereto during the incubation period. Good results have been secured by starting fermentation with a carbohydrate concentration of approximately 10 to 50 grams per liter, and adding, periodically, such as at intervals of substantially 24 to 48 hours during the incubation period, sufficient carbohydrate to restore the carbohydrate concentration of the medium to substantially its original level.

As assimilable carbon sources, I have found that glucose, fructose, sucrose, invert sugar, lactose, maltose, raffinose, melibiose, inulin, dextrins, and starches are suitable for the purpose of this invention. Sucrose may be supplied as the purified sugar or in the form of beet or cane molasses. Lactose may be supplied as the purified sugar or as whey or whey concentrate. Starchy materials are best used subsequent to a partial liquefaction obtained by treatment with enzymes or acids, in manners well-known to the art. The assimilable carbon source may be added either in solid form or in aqueous solution.

I find it desirable, but not essential, to accompany the assimilable carbon source added during the incubation period with a small quantity of protein including hydrolyzed protein, which serves as a nitrogen source and maintains the vegetative vigor of the mold.

The method of this invention is of value not only because of the high yield of penicillin obtained, but also because it permits the operation of a semi-continuous fermentation, with the realization of economies in operation. As soon as the penicillin content of the fermentation medium reaches a relatively high level, that is, about the fourth to sixth day, aliquots of the fermentation medium may be removed prior to the addition of the fresh nutrient medium containing the supplemental assimilable carbon source and possibly also the protein or hydrolyzed protein. Penicillin may be recovered from these removed aliquots. Since the method of this invention insures that high penicillin potencies will persist in the fermentation liquors, a sustained supply of source material for penicillin production is thus provided.

Usually only a relatively small aliquot of the penicillin-containing fermentation medium is removed and thereafter replaced with what I call the "feeding solution" of assimilable carbon sources and proteinaceous material. The removed volume usually amounts to only about 10 percent of the total volume. However, it has been found possible to remove and replace up to 50 percent of the medium in active cultures, and this feature is very favorable to semicontinuous operation. No limitations as to the number of removals and replacements have been observed. It is understood, of course, that the assimilable carbon source may be added with or without the simultaneous withdrawal of fermentation liquor.

Although the method of this invention is applicable to the production of penicillin in cultures where the fungus is cultivated on the surface of the nutrient medium, it is especially applicable and advantageous where the fungus is cultivated in the submerged state, as described in my co-pending and now abandoned application for patent Serial No. 530,233, filed April 8, 1944 (continuation in part, Serial No. 593,185, filed May 11, 1945), since such cultivation usually is made in tank fermenters which are readily provided with the means for withdrawing and adding liquid medium.

As illustrative of the manner in which this invention may be practiced, the following examples are cited, although the details are to be considered in no way restrictive:

*Example I*

A nutrient medium was prepared by dissolving 20 g. of commercial hydrated lactose, 3.0 g. of sodium nitrate, and 0.015 g. of zinc sulfate in approximately 500 ml. of water, adding thereto 75 ml. of concentrated corn-steeping liquor (30° Bé.), and sufficient water to make a total volume of one liter. After thorough mixing, 500 ml. portions of this medium were placed in 3-liter Fernbach flasks, which were plugged with cotton and sterilized at 15 lb. steam pressure in the conventional manner. After cooling to room temperature, each flask was inoculated with spores of *Penicillium notatum* Westling. The flasks were incubated at 24° C. On the third day of incubation, after the medium had been mixed well by mild agitation, 50 ml. of the incubation medium was withdrawn from below the mycelium by means of a sterile pipette, and 50 ml. of sterile medium containing 5.0 g. of glucose was added to the solution underlying the mycelium. Similar withdrawals and replacements were performed on the fifth, seventh, ninth, and eleventh days of the culture period. The penicillin content of the withdrawn fermentation medium was determined each day by the cup-plate agar assay method of Abraham et al. (Lancet 2, 177 (1941)), with the following results:

| Total incubation period, days | Penicillin content (Oxford units per ml. of fermentation medium) |
|---|---|
| 3 | 30 |
| 5 | 100 |
| 7 | 180 |
| 9 | 220 |
| 11 | 225 |

*Example II*

30 liters of a medium containing 10 g. of sucrose, 1.5 g. of sodium nitrate, 0.007 g. of zinc sulfate, and 30 g. of corn-steeping liquor per liter, was placed in a tank fermenter provided with a propeller-type agitator and an air diffusion stone. After sterilization in situ, the medium was cooled to 24° C. and inoculated with *Penicillium notatum Westling*. Aeration and agitation were continuous. Two days after inoculation, 5 liters of the mash were withdrawn and an equal volume of sterile medium containing 100 g. of sucrose and 100 g. of corn-steeping liquor was added aseptically to the fermenter. Similar withdrawals and additions were made on the fourth, sixth, eighth, tenth, and twelfth days of incubation. Assays for penicillin on these days showed the following penicillin content of the mash:

| Total incubation period, days | Penicillin content (Oxford units per ml. of fermentation medium) |
|---|---|
| 2 | 10 |
| 4 | 40 |
| 6 | 60 |
| 8 | 85 |
| 10 | 90 |
| 12 | 85 |

Having thus described my invention, I claim:

1. A method for producing penicillin comprising incubating a pencillin-producing mold in contact with an aqueous nutrient medium containing an assimilable carbon source and containing from 5.0 to 150 g. of degraded proteinaceous material per liter of medium, a portion of the assimilable carbon source being added at the beginning of the incubation period and additional increments thereof being added during the period to compensate for that used up by the mold, the total amount of assimilable carbon source used being from 5.0 to 150 g. per liter of medium.

2. The method of claim 1, in which the proteinaceous material is corn-steeping liquor.

3. The method of claim 1, in which the assimilable carbon source is glucose.

4. The method of claim 1, in which the medium also contains sodium nitrate.

5. The method of claim 1, in which the proteinaceous material is corn-steeping liquor and the assimilable carbon source is glucose.

6. The method of claim 5, in which the medium also contains sodium nitrate.

7. A method for producing penicillin comprising incubating a penicillin-producing mold in contact with an aqueous nutrient medium containing an assimilable carbon source and containing from 5.0 to 150 g. of a degraded proteinaceous material per liter of medium, a portion of the assimilable carbon source being added at the beginning of the incubation period, portions of the incubation medium being withdrawn during the incubation period and replaced with sterile mediums containing an assimilable carbon source to compensate for that used by the mold, the total amount of assimilable carbon source used being from 5.0 to 150 g. per liter of medium.

8. The method of claim 7, in which the assimilable carbon source is glucose and the proteinaceous material is corn-steeping liquor.

9. The method of claim 7, in which the nutrient medium also contains sodium nitrate.

ANDREW J. MOYER.

REFERENCES CITED

The following references are of record in the file of this patent:

UNITED STATES PATENTS

| Number | Name | Date |
|---|---|---|
| 1,726,067 | Herrick et al. | Aug. 27, 1929 |
| 2,326,986 | Waksman | Aug. 17, 1943 |

OTHER REFERENCES

Abraham et al., The Lancet, August 16, 1941, page 177.

Clifton Science, July 16, 1943, pages 69-70.

Coghill, Bi-Monthly Progress Report No. 8, Oct. 25, 1942.

Porges et al., Ind. and Eng. Chem., Jan. 1940, pages 107-108.